US008874722B2

(12) United States Patent
Gooding et al.

(10) Patent No.: US 8,874,722 B2
(45) Date of Patent: Oct. 28, 2014

(54) INTERACTIVE TOOL FOR VISUALIZING PERFORMANCE DATA IN REAL-TIME TO ENABLE ADAPTIVE PERFORMANCE OPTIMIZATION AND FEEDBACK

(75) Inventors: Thomas Michael Gooding, Rochester, MN (US); David Lee Hermsmeier, Oronoco, MN (US); Roy Glenn Musselman, Rochester, MN (US); Amanda Peters, Rochester, MN (US); Kurt Walter Pinnow, Rochester, MN (US); Brent Allen Swartz, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 11/863,682

(22) Filed: Sep. 28, 2007

(65) Prior Publication Data

US 2009/0089013 A1 Apr. 2, 2009

(51) Int. Cl.
| G06F 15/173 | (2006.01) |
| G06F 15/177 | (2006.01) |
| G06F 11/32 | (2006.01) |
| H04L 12/24 | (2006.01) |
| G06F 11/34 | (2006.01) |
| H04L 29/08 | (2006.01) |
| H04L 12/26 | (2006.01) |

(52) U.S. Cl.
CPC .......... *G06F 11/321* (2013.01); *G06F 2201/88* (2013.01); *H04L 67/10* (2013.01); *H04L 41/5003* (2013.01); *G06F 11/3404* (2013.01); *H04L 43/16* (2013.01); *H04L 41/22* (2013.01); *H04L 41/082* (2013.01)
USPC .......................................... 709/224; 715/736

(58) Field of Classification Search
USPC ........................................... 709/224; 715/736
See application file for complete search history.

(56) References Cited

U.S. PATENT DOCUMENTS

| 5,255,190 | A | | 10/1993 | Sznaider | |
| 5,452,468 | A | | 9/1995 | Peterson | |
| 5,596,703 | A | | 1/1997 | Eick et al. | |
| 5,835,085 | A | * | 11/1998 | Eick et al. | ...................... 715/853 |
| 6,360,337 | B1 | * | 3/2002 | Zak et al. | ...................... 714/47.1 |
| 6,642,931 | B1 | * | 11/2003 | Haikin et al. | ................. 345/601 |
| 6,762,759 | B1 | | 7/2004 | Lake et al. | |
| 7,434,002 | B1 | | 10/2008 | Zedlewski et al. | |
| 7,526,534 | B2 | * | 4/2009 | Henseler | ........................ 709/220 |
| 7,647,590 | B2 | | 1/2010 | Archer et al. | |
| 7,676,530 | B2 | * | 3/2010 | Adkisson et al. | ............. 708/207 |
| 7,852,337 | B2 | * | 12/2010 | Archer et al. | .................. 345/440 |
| 7,856,549 | B2 | * | 12/2010 | Wheeler | ........................... 713/1 |

(Continued)

OTHER PUBLICATIONS

Office Action history of U.S. Appl. No. 11/863,620, dates ranging from Sep. 1, 2010-May 11, 2011.

(Continued)

*Primary Examiner* — Rupal Dharia
*Assistant Examiner* — Van Kim T Nguyen
(74) *Attorney, Agent, or Firm* — Patterson & Sheridan LLP

(57) ABSTRACT

An interactive tool is disclosed for visualizing performance data in real-time to enable adaptive performance optimization for an application running on a massively parallel computer system. The interactive tool may be used to visualize network congestion (and other) performance counters for an application as it runs on the parallel system in real-time. Further, a developer may use the interactive tool to experiment with various tuning options and optimization approaches on-the-fly.

18 Claims, 6 Drawing Sheets

(56) References Cited

U.S. PATENT DOCUMENTS

| | | |
|---|---|---|
| 2002/0080181 A1* | 6/2002 | Razdow et al. ............... 345/772 |
| 2004/0042020 A1* | 3/2004 | Vondran, Jr. .................. 358/1.9 |
| 2005/0151839 A1 | 7/2005 | Ito et al. |
| 2006/0101104 A1* | 5/2006 | Bhanot et al. ................. 708/105 |
| 2006/0101134 A1 | 5/2006 | Nocera et al. |
| 2007/0214412 A1 | 9/2007 | Arquie et al. |
| 2008/0092121 A1* | 4/2008 | DeRose et al. ................ 717/125 |
| 2008/0168313 A1* | 7/2008 | Blocksome et al. ............ 714/47 |
| 2008/0184214 A1* | 7/2008 | Archer et al. ................. 717/155 |
| 2008/0195840 A1 | 8/2008 | Archer et al. |
| 2008/0201657 A1 | 8/2008 | Archer et al. |
| 2009/0067334 A1 | 3/2009 | Archer et al. |
| 2009/0089013 A1 | 4/2009 | Gooding et al. |
| 2009/0089670 A1 | 4/2009 | Gooding et al. |

OTHER PUBLICATIONS

Heath, Michael T. et al., ParaGraph: A Performance Visualization Tool for MPI, Center for Stimulation of Advanced Rockets, Aug. 2003, University of Illinois at Urbana-Champaign, Urbana, IL, United States.

Becker-Lemgau, "Intel Trace Analyzer/Collector Introduction and Tutorial", Oct. 18, 2004, Istanbul Technical University, Istanbul, Turkey (http://www.be.itu.edu.tr/news/grid_atolye/ITA-ITC-tutorial-20041018.pdf).

Holland, "High Productivity Computing Systems (HPCS)", DARPA Information Processing Technology Office, Online (http://www.darpa.mil/ipto/programs/hpcs/programplan.htm).

Vetter et al., "Real-time Performance Monitoring, Adaptive Control, and Interactive Steering of Computational Grids", Caltech ASCI Technical Report 053, California Institute of Technology, USA.

Shaffer et al., "Virtue: Performance Visualization of Parallel and Distributed Applications", Computer, Dec. 1999, vol. 32, Issue 12, IEEE Computer Society.

* cited by examiner

INTERACTIVE TOOL FOR VISUALIZING PERFORMANCE DATA IN REAL-TIME TO ENABLE ADAPTIVE PERFORMANCE OPTIMIZATION AND FEEDBACK

CROSS-REFERENCE TO RELATED APPLICATIONS

This application is related to U.S. patent application Ser. No. 11/863,620, entitled "Interactive Tool for Visualizing Performance Data in Real-Time to Enable Adaptive Performance Optimization and Feedback", filed Sep. 28, 2007, by Gooding et al. This related patent application is herein incorporated by reference in its entirety.

BACKGROUND OF THE INVENTION

1. Field of the Invention

The present invention generally relates to parallel computing. More specifically, the present invention relates to an interactive tool for visualizing performance data in real-time to enable adaptive performance optimization and feedback.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

In addition to the Blue Gene architecture developed by IBM, other highly parallel computer systems have been (and are being) developed. For example, a Beowulf cluster may be built from a collection of commodity off-the-shelf personal computers. In a Beowulf cluster, individual systems are connected using local area network technology (e.g., Gigabit Ethernet) and system software is used to execute programs written for parallel processing on the cluster of individual systems.

Compute nodes in a parallel system communicate with one another over one or more communication networks. For example, the compute nodes of a Blue Gene/L system are interconnected using five specialized networks, and the primary communication strategy for the Blue Gene/L system is message passing over a torus network (i.e., a set of point-to-point links between pairs of nodes). This message passing allows programs written for parallel processing to use high level interfaces such as Message Passing Interface (MPI) and Aggregate Remote Memory Copy Interface (ARMCI) to perform computing tasks and to distribute data among a set of compute nodes. Other parallel architectures (e.g., a Beowulf cluster) also use MPI and ARMCI for data communication between compute nodes. Low level network interfaces communicate higher level messages using small messages known as packets. Typically, MPI messages are encapsulated in a set of packets which are transmitted from a source node to a destination node over a communications network (e.g., the torus network of a Blue Gene system).

Frequently, network contention is a major problem for the scalability of an application on a large parallel system. That is, compute nodes may compete with one another for access to the communication networks interconnecting the nodes on which the application is executing and as more compute nodes are dedicated to a given application, the more internode communication is typically required. Thus, it is desirable to optimize the configuration a given software application, including optimizing network communication patterns of the application. Further, communication patterns tend to be different at computational phases of program execution and are often quite complex.

Furthermore, supercomputing resources are a scarce commodity, and access to a parallel computing system is usually rented and/or allocated in small discrete blocks of time. When optimizing such an application, therefore, it is important to gather as much information on as many configurations of a parallel system and/or an application as is possible within an allotted time window.

Accordingly, there remains a need for an interactive tool for visualizing performance data in real-time to enable adaptive performance optimization and feedback on a large parallel computing system.

SUMMARY OF THE INVENTION

One embodiment of the invention provides a method a computer-implemented method of generating a visual representation of performance data for an application running on a plurality of compute nodes of a parallel computing system. The method generally includes receiving a selection of one or more performance counters present on the plurality of compute nodes and receiving a value for each of the selected performance counters. The values may be received without disrupting the performance of the application running on the plurality of compute nodes. The method also includes generating a visual display of the plurality of compute nodes that depicts the plurality of compute nodes and depicts a performance characteristic of the application, as reflected by the received values for each of the selected performance counters.

Another embodiment of the invention includes a method of generating a visual representation of performance data for an application running on a plurality of compute nodes of a parallel computing system. The method generally includes receiving a selection of one or more performance counters present on the plurality of compute nodes and receiving a value for each of the selected performance counters for each of the plurality of compute nodes. The values may be received without disrupting the performance of the application running on the plurality of compute nodes. The method may also include determining a maximum value for the selected performance counter and a minimum value for the selected performance counter, generating a three-dimensional (3D) wireframe image representing the plurality of compute nodes. For each of the plurality of compute nodes, a weighted color value is determined. The weighted color value is based on the value of the performance counter for each respective compute node, the maximum value, and the minimum value. The method may also include coloring the three-dimensional (3D) wireframe image based on the weighted color value determined for each of the plurality of compute nodes node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
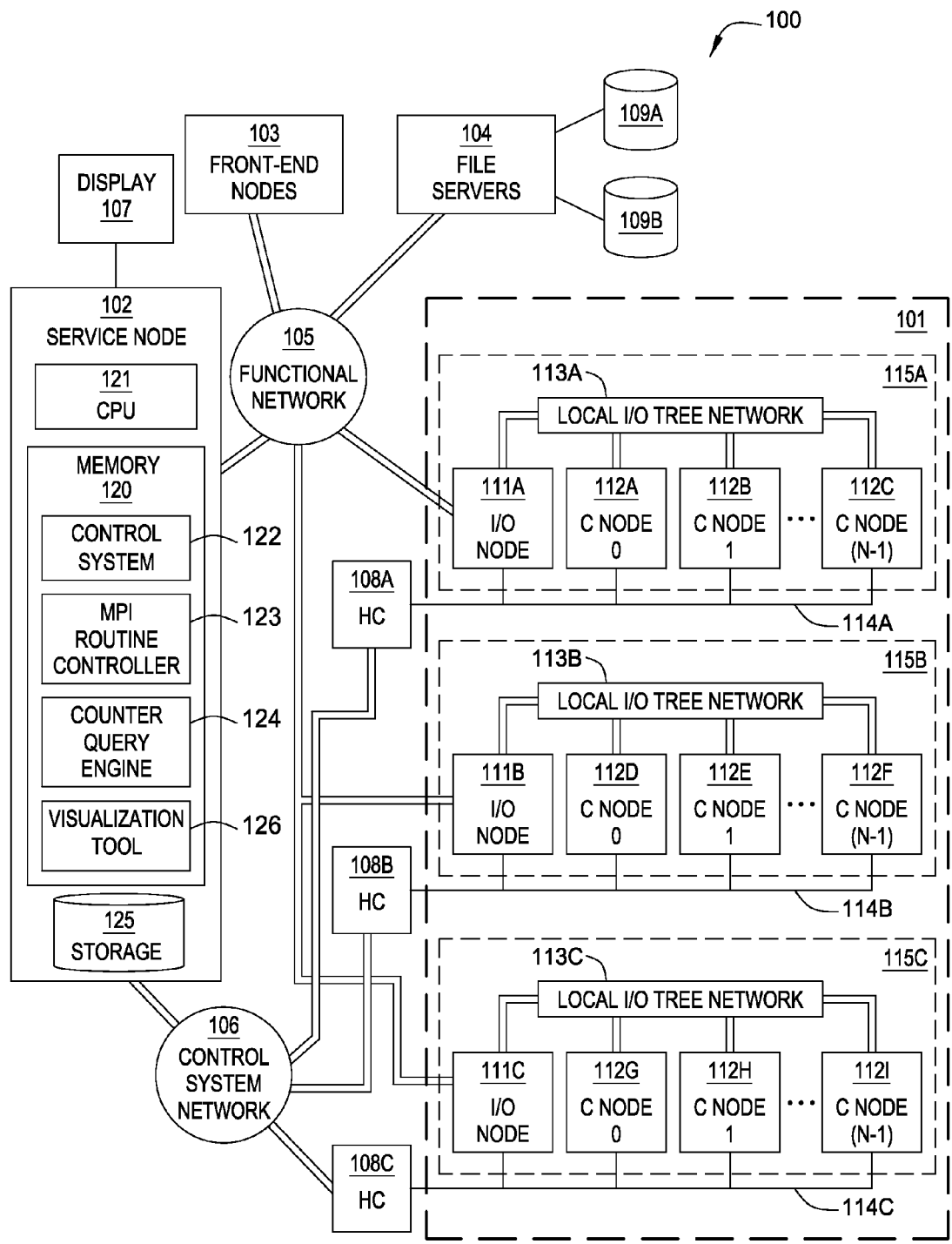
FIG. 1 is a high-level block diagram of components of a massively parallel computer system, according to one embodiment of the present invention.

Embodiments of the invention provide an interactive tool for visualizing performance data in real-time to enable adaptive performance optimization for an application running on a massively parallel computer system. For example, embodiments of the invention may be used to diagnose and alleviate network congestion problems and improve application scalability on message passing supercomputers such as the Blue Gene architecture developed by IBM. Of course, embodiments of the invention may be adapted for use with other parallel systems that use message passing for node-to-node communications. In one embodiment, an interactive tool may be used to visualize the network (and other) performance counters recorded for an application as the application runs on the parallel system in real-time. Further, a developer may use the interactive tool to experiment with various tuning options and optimization approaches on-the-fly.

The developer may use visual displays generated by the interactive tool to identify bottlenecks in the network communication patterns of an application as well as to devise improvements to those bottlenecks. Additionally, by displaying the network performance in real-time, the developer may immediately see the effect of a given change, allowing the developer to evaluate potential changes without having to repeatedly stop and start the application. This approach reduces the amount of time required to determine an optimal configuration for a given application.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive, a hard-disk drive, volatile and non-volatile memory such as flash and dynamic random access memory) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100 and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

In a Blue Gene system, compute nodes 112 are connected by multiple independent networks. Other massively parallel architectures also use multiple networks for node-to-node communication. Specifically, in a Blue Gene system, a torus network connects the compute nodes 112 in a 3D mesh with wrap around links. Each compute node 112 is connected to its six neighbors through the torus network, and is addressed by an (x, y, z) coordinate in within the mesh. Thus, each compute node 112 may transmit a message directly to a neighboring node in the X+ and X−, the Y+ and Y−, and the Z+ and Z− directions.

Figure 2:
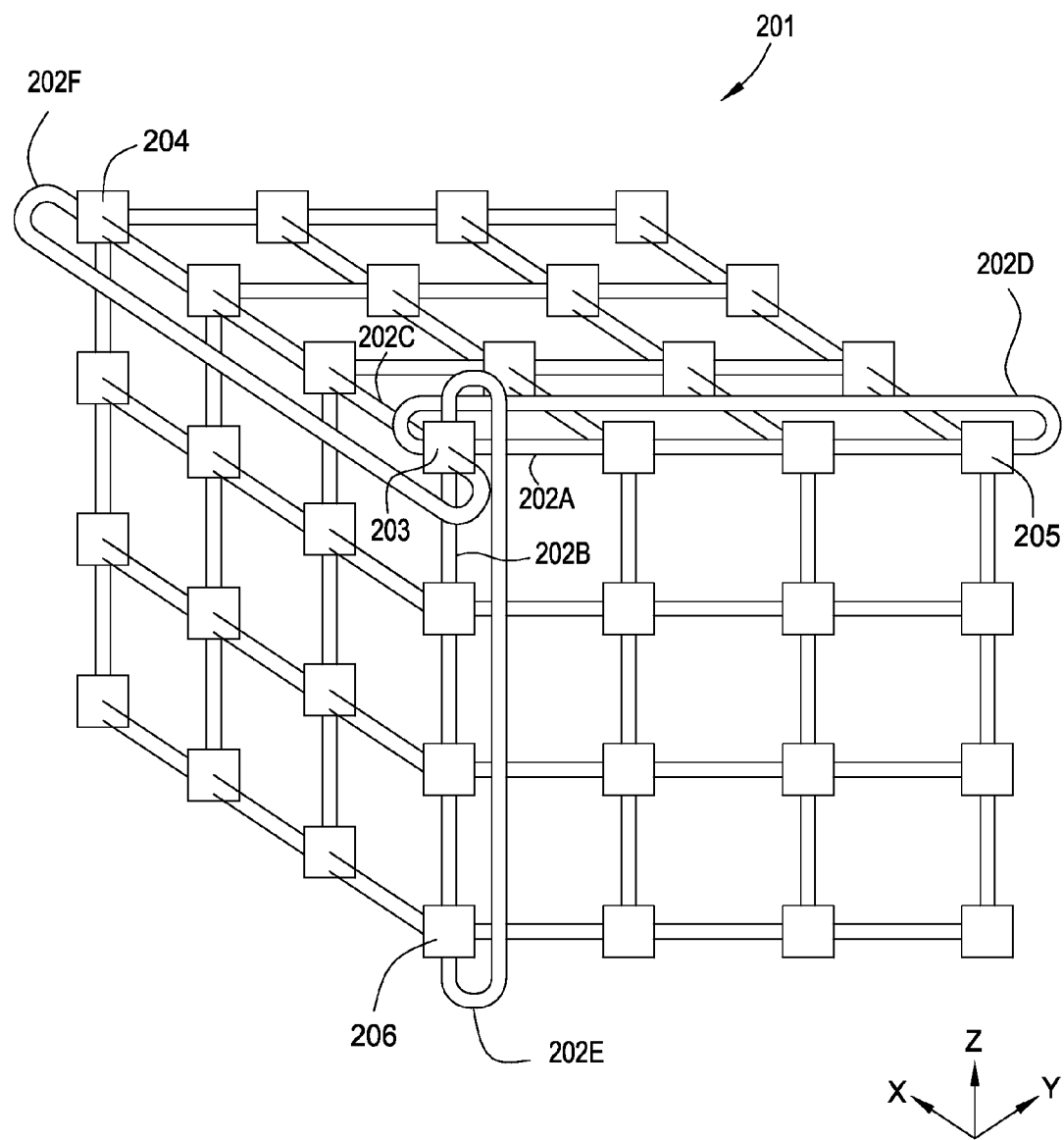
FIG. 2 is a conceptual illustration of a three dimensional torus network of the system of FIG. 1, according to one embodiment of the invention.

FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

The compute nodes in each of the x, y, or z dimensions form a torus in that dimension because the point-to-point communication links logically wrap around. As shown, for example, links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Referring again to FIG. 1, another network on the Blue Gene system is a global combining network (i.e., tree network 113), which connects compute nodes 112 in a binary tree. In the combining network, each compute node 112 has a parent and two children (although some nodes may have zero or one child, depending on the hardware configuration). It is also important to note that in the Blue Gene architecture, the tree and torus networks are independent networks. That is, these networks do not share network resources such as links or packet injection FIFOs. Communication networks in other parallel architectures have similar characteristics.

A third network on a Blue Gene system is the JTAG (Joint Test Action Group) network (i.e., control system network 106), which may be configured to provide a hardware monitoring facility. As is known, JTAG is a standard for providing external test access to integrated circuits serially, via a four- or five-pin external interface. The JTAG standard has been adopted as an IEEE standard. Within the Blue Gene system, the JTAG network may be used to send performance counter data to service node 102 in real-time. That is, while an application is running on compute core 101, performance data may be gathered and transmitted to service node 102 without affecting the performance of that application. For example, in one embodiment, the JTAG network may be used to record floating point and cache performance on a given compute node 112, along with the number of network packets that pass through any of the six network ports (X+, X−, Y+, Y−, Z+, Z−) on that compute node 112. These hardware counters allow the network traffic (and memory access performance) to be monitored without affecting the performance of the application being monitored. Further, in one embodiment, the JTAG network may be used to modify the operational state of compute core 101 while an application is running, without disrupting application performance. For example, the JTAG network may be used to specify what message passing protocol should be used by compute nodes 112 (or to adjust a configuration for a current message passing protocols).

Service node 102 communicates control and state information with the nodes of compute core 101 over control system network 106. Network 106 is coupled to a set of hardware controllers 108A-C (e.g., a JTAG controller). Each hardware controller communicates with the nodes of a respective Pset 115 over a corresponding local hardware control network 114A-C. The hardware controllers 108 and local hardware control networks 114 are logically an extension of control system network 106, although physically separate.

In one embodiment, service node 102 may be configured to direct and/or monitor the operation of the compute nodes 112 in compute core 101. Service node 102 is a computer that includes a processor (or processors) 121, internal memory 120, and local storage 125. A display device 107 provides an LCD or CRT display monitor. Illustratively, memory 120 of service node 102 includes a control system 122, an MPI runtime controller 123, a performance counter query tool 124, and a visualization tool 126.

Control system 122 may be a software application configured to control the allocation of compute nodes 112 in compute core 101, direct the loading of application and data on compute nodes 111, and perform diagnostic and maintenance functions, among other things. MPI runtime controller 124 may be a software application used to configure the protocols used by compute nodes 111 to communicate using MPI (or other) messages. For example, MPI runtime controller 124 may be used to select between message passing strategies such as the well-known "eager" and "rendezvous" protocols. When using the eager protocol, a sending node assumes that a receiving node can receive and store the message if it is sent. The receiving node has the responsibility to buffer the message upon its arrival. The eager protocol is generally used for smaller message sizes (typically up to Kbytes in size). The rendezvous protocol is used when assumptions about the receiving process buffer space cannot be made, or when a message size limit specified for the eager protocol is exceeded. The rendezvous protocol requires some type of "handshaking" between the sender and the receiver processes. Typically, in a rendezvous implementation, the sender must first send a request and receive an acknowledgment before a message may be transferred.

In one embodiment, performance counter query tool 124 may be a software application configured to query and report on performance counter data received over control system network 106. For example, query tool 124 may collect the counter values representing the number of network packets that pass through any of the six network ports (X+, X−, Y+, Y−, Z+, Z−) on a given compute node 112. Visualization tool 126 may be a software application configured to use the performance counter data received from query tool 124 and generate a visual representation of the performance of parallel computing system 100. For example, the visualization tool 126 may be configured to alter the colors used to depict a compute node as the counter value increases. In such a case, the color may depend on the traffic that passes through a single network port (e.g., X+) or may be a composite of all traffic through a given node. To provide a visual display reflecting network contention, compute nodes 112 in a state of high contention may be displayed more red than compute nodes 112 in a state of low contention. Further, in one embodiment, visualization tool 126 may also provide a variety of visualization techniques which could be employed by the developer (e.g., a display of a selected slice of the compute nodes or a fly-through animation, etc.).

In addition to service node 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 3:
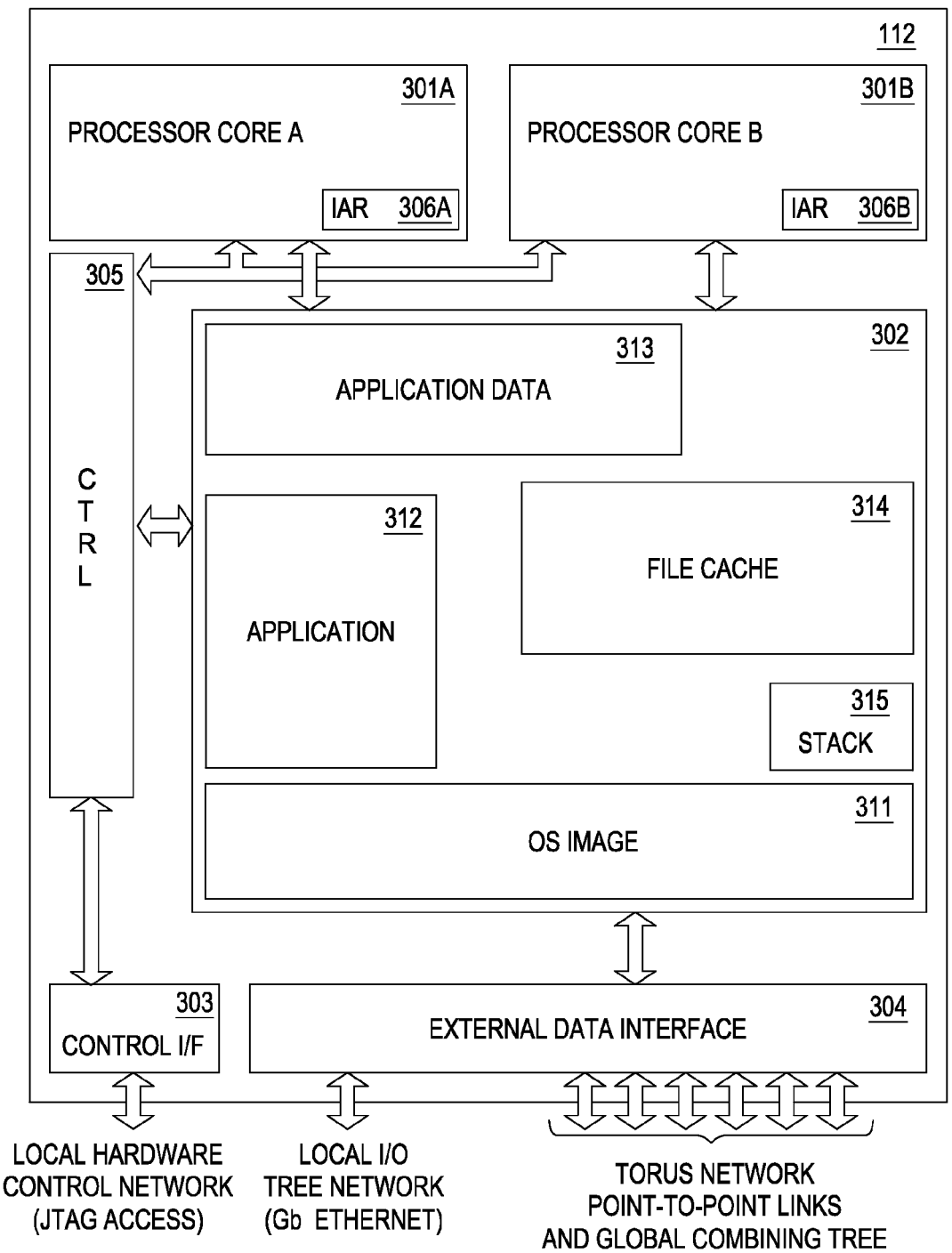
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the application code being executed by compute node 112. Application code image 302 may include a copy of a computer program being executed by system 100. In one embodiment, each node may execute an identical copy of the same application, where each copy is configured to cooperate with others. Alternatively, an application may be configured as a collection of dissimilar components configured to perform specialized tasks as part of the parallel application processing. Memory 302 may also include a call-return stack 315 for storing the states of procedures which must be returned to, which is shown separate from application code image 302, although it may be considered part of application code state data.

As part of ongoing operations, application 312 may be configured to transmit packets from compute node 112 to other compute nodes in parallel system 100. For example, the high level MPI call of MPI_Send( ); may be used by application 312 to transmit a message (encapsulated in a sequence of packets) from one compute node to another. On the other side of the communication, the receiving node may invoke the MPI call MPI_Receive( ); to receive and process the message. As described above, in one embodiment, each compute node 112 may include hardware based counters configured to count now many packets are passed over the external data interface 304 of a given compute node 112 and report this information to service node 102 over control system network 106 using control network interface 303.

Figure 4:
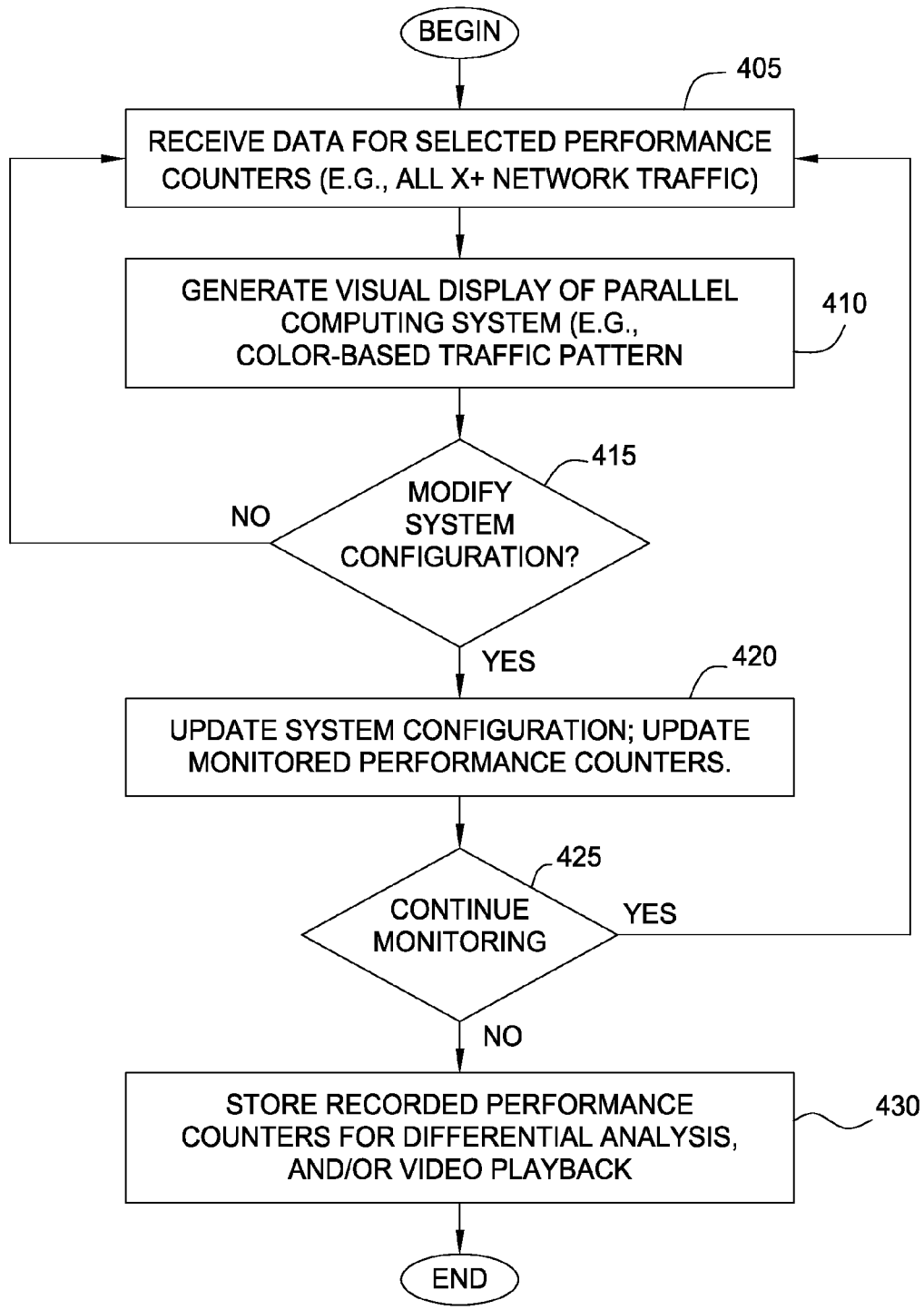
FIG. 4 is a flow diagram illustrating a method for visualizing performance data in real-time to enable adaptive performance optimization and feedback on a massively parallel computer system, according to one embodiment of the invention.

FIG. 4 is a flow diagram illustrating a method for visualizing performance data in real-time to enable adaptive performance optimization and feedback on a massively parallel computer system, according to one embodiment of the invention. As shown, the method 400 begins at step 405, where data for a selected performance counter is received. For example, as stated, the performance counters may record the number of messages that pass through a given network port (e.g. X+) of each compute node 112 running a given application.

At step 410, a visual display is generated that shows the performance of the parallel system. The visual display depicts the performance counter data received at step 405. For example, the visual representation may depict network congestion on the 3-D torus of a Blue Gene system. Doing so may allow application developers and other users to detect "hotspots" (i.e., areas of significant network congestion), patterns of usage and potential inefficiency, etc. In one embodiment, the visual display may be generated and displayed in real-time. That is, it may be generated and displayed while the application is actively executing on the compute nodes of the parallel system. Further, the visual display may be updated in real-time to reflect the ongoing performance of the application running on the parallel computing system as different functions are performed.

By reviewing the visual display, the developer may formulate possible changes to the configuration of the parallel system to increase the performance and scalability of the application. At step 415, the visualization tool 126 determines whether the system configuration has been modified. If not, then the method returns to step 405 and continues to update the visual representation of application performance on the parallel system.

Otherwise, at step 420, the parallel system configuration and/or the monitored performance counters may be updated. For example, the developer may experiment with application performance in real-time by trying different routing protocols or by modifying the values of network communication parameters. In such a case, the developer could switch the routing protocol from eager to rendezvous (or vice versa), or could explore alternative routing schemes (e.g., transporter nodes, implicit barrier remapping, alternative static routing heuristics, etc.), adjust MPI environment variables, and other experiments to evaluate how network performance (and thus application scaling) is affected in real-time. In one embodiment, service node 102 may communicate changes to the configuration of the parallel system using control system 106 (e.g., via the JTAG network of a Blue Gene system). Depending on the particular change, the change could take affect immediately (e.g., a hardware configuration change). In other cases, the change could take affect at the next stage of the application (e.g., if MPI messages are needed to change protocols at a defined state or change which performance counters are monitored).

At step 425, if the developer wishes to continue monitoring, then the method 400 returns to step 405. Otherwise, at step 430, data recorded from a given session may be stored. For example, the performance counter data may be stored for later differential analysis and/or a time-lapse payback. That is, visualization tool may be configured to display the differences between two performance measurements. In such a case, the visualization tool may be used generate a display by subtracting the performance counter data before and after a change was made to the network routing. This would allow the performance changes caused by an experiment to be highlighted. For example, the difference between executing an application on the compute nodes of a parallel system using the eager protocol versus the rendezvous protocol could be displayed.

Further, in one embodiment, the visualization tool may facilitate an analysis of the communication patterns of an application over time. Storing the performance counter data allows it to be used to generate a time-lapse animation sequence of application performance. The developer may use an interface provided by visualization tool 126 to rewind back to previously viewed performance data, pause to study a certain instance of network contention, fast forward at a user selected speed (½ times (×) faster, 1×, 2×, 3×, etc.), skip forward or backward to certain phases, etc.

Figure 5A:
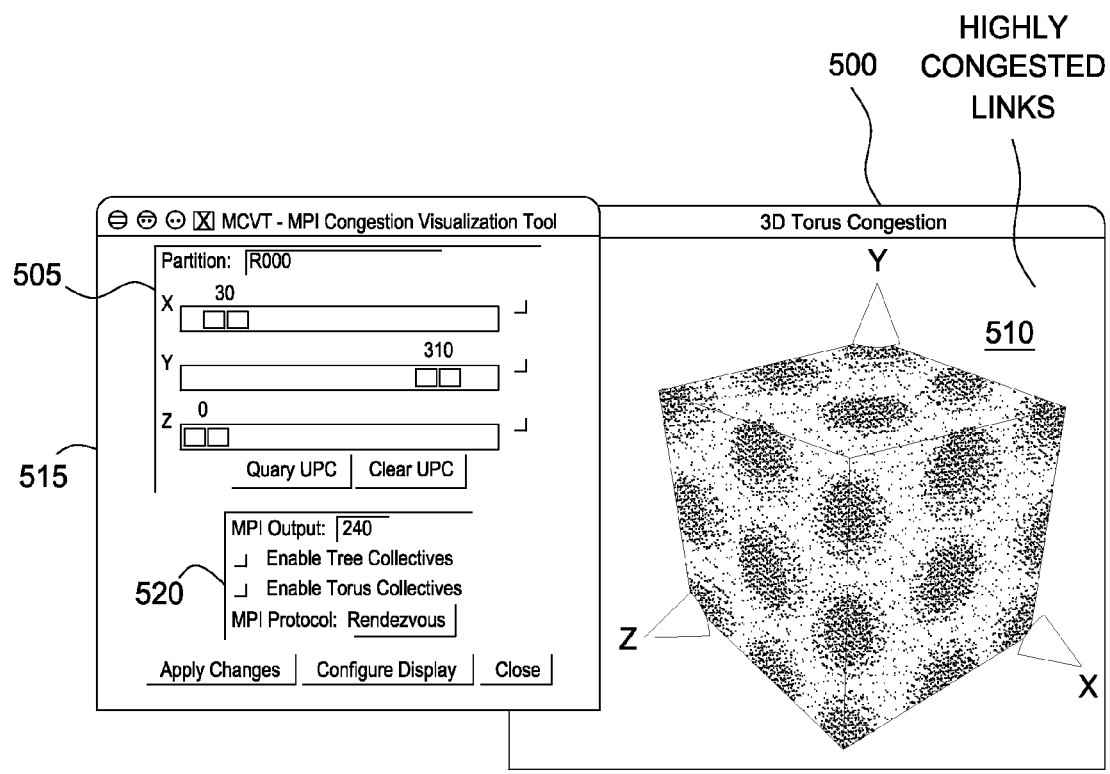
FIGS. 5A and 5B illustrate an example user interface of an interactive tool for visualizing performance data in real-time to enable adaptive performance optimization and feedback, according to one embodiment of the invention.
Figure 5B:
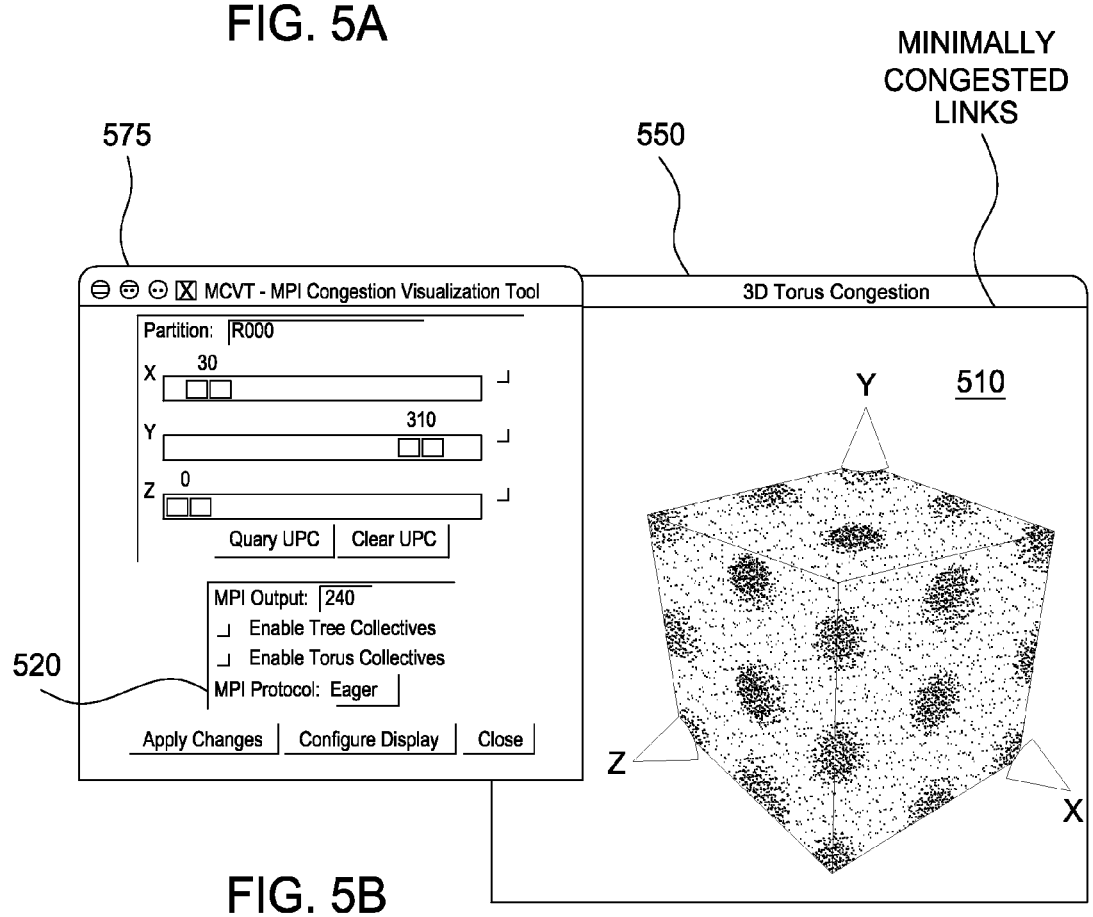

FIGS. 5A and 5B illustrate an example user interface of an interactive tool for visualizing performance data in real-time to enable adaptive performance optimization and feedback, according to one embodiment of the invention. As shown in FIG. 5A, visual display 500 depicts a representation of an application's network communication pattern projected onto the compute nodes of a three-dimensional torus network 510 (e.g., a torus network of a Blue Gene system). Illustratively, the torus network 510 illustrated in visual display 500 has a high degree of network congestion on the node-to-node communication links, represented by the dense level of darkly shaded regions of torus network 510. Also, a dialog box 515 includes a node selection tool 505 used to specify and query for the performance data related to a given compute node 112. Dialog box 515 also includes an MPI configuration tool 520. In this example, MPI configuration tool 520 has been used to set MPI communications on the torus network to use the rendezvous protocol.

FIG. 5B shows a visual display 550 after reconfiguring the application running on torus network 510 to use the eager protocol for MPI message passing. MPI configuration tool 520 of dialog box 575 now shows that the eager protocol has been selected. In this example, assume that using eager protocol leads to substantially less network congestion for the application running on the torus network 510. Accordingly, the relative level of congestion shown on the torus network 510 shown in visual display 550 depicts minimally congested links, relative to the amount of network congestion in visual display 500, illustrating the reduction in network contention that resulted from the change from the rendezvous protocol to the eager protocol.

Figure 6:
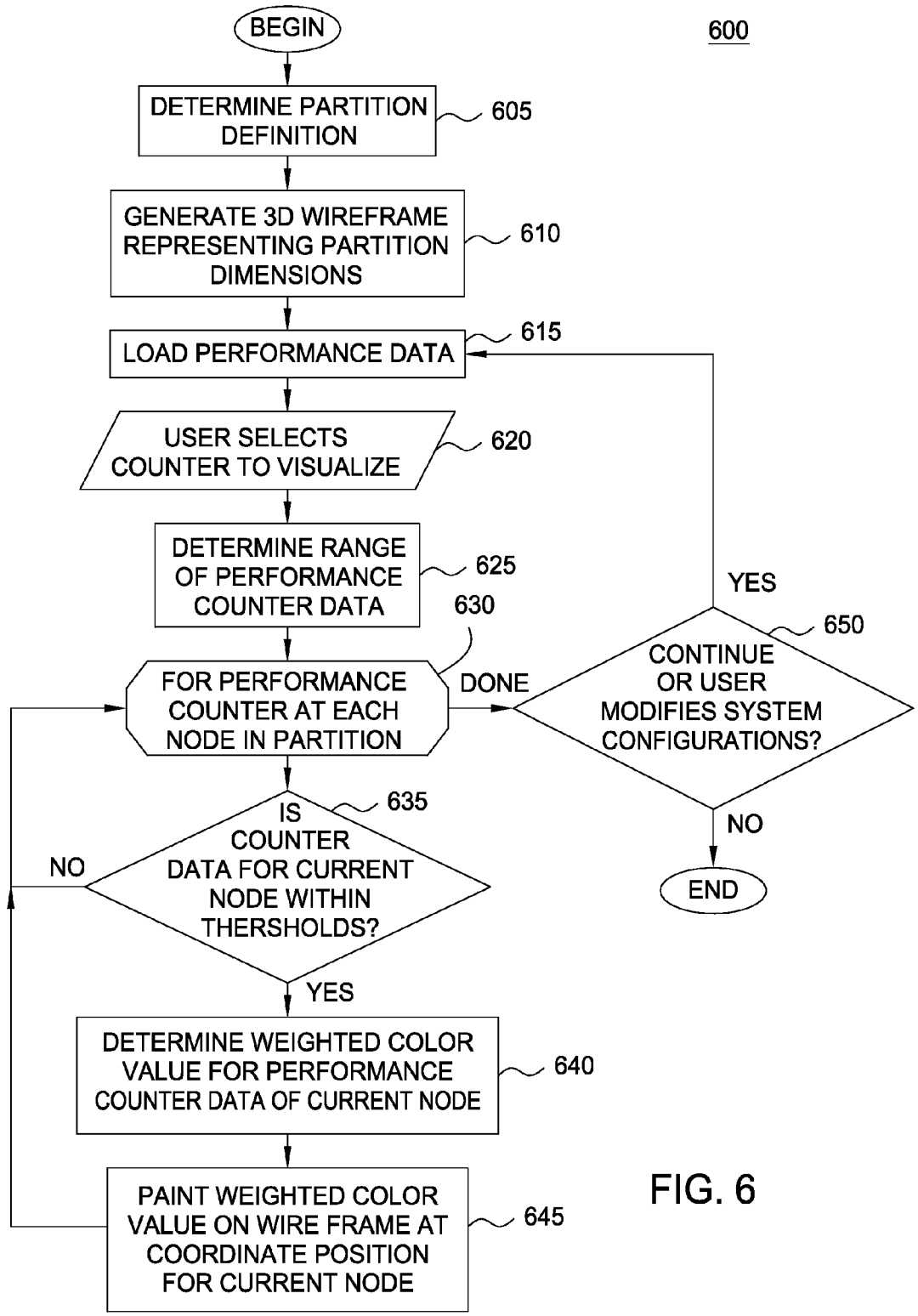
FIG. 6 illustrates a method for generating a visualization of performance data in real-time, according to one embodiment of the invention.

FIG. 6 illustrates a method 600 for generating a visualization of performance data in real-time, such as the visualization of the torus of compute nodes shown in FIGS. 5A and 5B, according to one embodiment of the invention. As shown, the method 600 begins at step 605 where visualization tool 126 may determine an active partition currently running an application. For example, on a Blue Gene system, applications run on a block of partitions composed from compute nodes in an x, y, and z dimension. When the dimensions are the same (i.e., when x=y=z), the partition forms the shape of a cube, such as the torus 510 shown in FIG. 5A.

At step 610, the visualization tool 126 may generate a 3D wireframe representing the partition dimensions. And at step 615, the visualization tool 126 may load performance data related to the application being run on the parallel system. As described above, in one embodiment, the performance data may be collected through a JTAG network independently from the actions of the application. That is, the performance data may be collected without having an impact on the performance of the application. At step 620, a user may select which performance counters the user would like to visualize. For example, as described, performance counters may record the number of network packets injected on each of the six point-to-point links from each compute node in the partition running the application. Other performance counters include the number of floating point multiply operations performed at each compute node, or memory utilization counters, e.g., the number of cache misses/hits or the number of DDR paging operations, performed at each compute node.

At step 625, the visualization tool 126 may determine a minimum and maximum value for the performance counter selected at step 620. In one embodiment, the range between the maximum and minimum value is used to determine a weighted color value for the performance counter for each node. For example, if the performance data for network traffic ranged from 0 to 200 packets per node, this information could be visualized by assigning different color values to different ranges of packets. Thus, the color values assigned to the busiest node (e.g., nodes in the top 10% with 180-200 packets) could be painted on the wireframe in red. In contrast, color values assigned to the least busy node (e.g., nodes in the bottom 10% with 0-20 packets) could be painted on the wireframe in blue. Further, in one embodiment, thresholds may be set to prevent intermittent traffic from cluttering the visual display. For example, a threshold may require that a node exhibit a minimum amount of network traffic before being shown on the visualization.

Once the user has specified what performance data to be visualized, and the visualization tool 126 has retrieved this data, at step 630 a loop begins to generate a visual display showing the performance of the application running on the partition, relative to the performance counter selected at step 620. At step 635, the visualization tool 126 determines whether the counter data for a current node is within any minimum or maximum thresholds specified by the user. If not, then tool returns to step 630 and evaluates the performance counter data for another node. Otherwise, at step 640, visualization tool 126 calculates a weighed color value for the current node, based on the range of values for the selected performance counter and the value of the performance counter for the current node. At step 645, the color value determined at step 640 is used to color a portion of the 3D wireframe generated at step 610. In particular, a position corresponding to the coordinate position of the current node within the partition.

In one embodiment, the process of loading performance data (step 615) and the loop of steps 630, 635, 640, and 645, may continue until the user decides either to quit or to modify the system configuration at step 650. Thus, the visualization may take on the appearance of an animation showing "hot" regions of the application running on the partition as the performance characteristics of the application change over time.

Advantageously, embodiments of the invention may be used to increase the performance and scalability of an application running on a massively parallel computing system, such as a Blue Gene system. The performance visualization tool disclosed herein may be used to visualize the network (and other) performance counters of the parallel system during application execution in real-time. Further, a developer may experiment with various tuning options and optimization approaches on-the-fly. The ability to visualize the network performance of an application as it executes allows the developer to identify bottlenecks in the network communication patterns of the application and thus devise improvements to those bottlenecks. Moreover, by displaying the network performance in real-time, the developer may immediately see the effect of a given change, allowing the developer to evaluate potential changes without having to repeatedly stop and start the application.

While the foregoing is directed to embodiments of the present invention, other and further embodiments of the invention may be devised without departing from the basic scope thereof, and the scope thereof is determined by the claims that follow.

What is claimed is:

1. A method of generating a visual representation of performance data for an application running on a plurality of compute nodes of a parallel computing system, wherein instances of the application communicate with one another using a first network, comprising:
   receiving a value for each of one or more dedicated hardware performance counters present on the plurality of compute nodes, wherein the values are received using a second network that is separate from the first network and without disrupting the performance of the application, and wherein a first one of the one or more dedicated hardware performance counters is configured to count a number of packets that pass through a plurality of network ports coupled to one of the plurality of compute nodes;
   determining both a maximum value and a minimum value for each dedicated hardware performance counter, wherein the determined maximum value represents a maximum value for the dedicated hardware performance counter across all of the plurality of compute nodes, and wherein the determined minimum value represents a minimum value for the dedicated hardware performance counters across all of the plurality of compute nodes;
   for each of the plurality of compute nodes, determining a weighted color value relative to the received values for the other compute nodes in the plurality of compute nodes, wherein the weighted color value is based on the received value for the respective compute node, the respective maximum value for the dedicated hardware performance counter, and the respective minimum value for the dedicated hardware performance counter; and
   generating a three-dimensional visual display representing the plurality of compute nodes, wherein the three-dimensional visual display depicts a network topology of the plurality of compute nodes and is colored based on the weighted color values determined for the plurality of compute nodes.

2. The method of claim 1, wherein the generated three-dimensional visual display depicts a measure of network congestion of the plurality of network ports.

3. The method of claim 2, wherein the communication links interconnect the plurality of compute nodes as a multi-dimensional torus.

4. The method claim 2, wherein the plurality of compute nodes pass messages using the Message Passing Interface (MPI) protocol.

5. The method of claim 1, wherein the generated three-dimensional visual display depicts a measure of floating point performance and a cache performance on a given compute node of the plurality of compute nodes.

6. The method of claim 1, further comprising:
   modifying a configuration setting of the plurality of compute nodes of the parallel computing system, without disrupting the application running on the plurality of compute nodes; and
   receiving an updated value for each of the dedicated hardware performance counters, without disrupting the performance of the application running on the plurality of compute nodes; and generating an updated three-dimensional visual display representing the plurality of compute nodes, wherein the updated three-dimensional visual display depicts the network topology of the plurality of compute nodes, and wherein the updated three-dimensional visual display is colored based on a respective weighted color value calculated for each of the plurality of compute nodes based on the received updated values, an updated maximum value, and an updated minimum value.

7. The method of claim 6, further comprising storing the generated three-dimensional visual display and the updated three-dimensional visual display.

8. The method of claim 1, further comprising, generating a time-lapse animation depicting changes in the dedicated hardware performance counters that occur while the application is running on the parallel system.

9. A method of generating a visual representation of performance data for an application running on a plurality of compute nodes of a parallel computing system, wherein instances of the application communicate with one another using a first network, comprising:
receiving a value for each of one or more dedicated hardware performance counters present on the plurality of compute nodes, wherein the values are received using a second network that is separate from the first network and without disrupting the performance of the application, and wherein a first one of the one or more dedicated hardware performance counters is configured to count a number of packets that pass through a plurality of network ports coupled to one of the plurality of compute nodes;
determining both a maximum value and a minimum value for dedicated hardware performance counter, wherein the determined maximum value represents a maximum value for the dedicated hardware performance counter across all of the plurality of compute nodes, and wherein the determined minimum value represents a minimum value for the dedicated hardware performance counters across all of the plurality of compute nodes;
for each of the plurality of compute nodes, determining a weighted color value relative to the received values for the other compute nodes in the plurality of compute nodes, wherein the weighted color value is based on the received value for the respective compute node, the respective maximum value for the dedicated hardware performance counter, and the respective minimum value for the dedicated hardware performance counter; and
generating a three-dimensional wireframe image representing the plurality of compute nodes, wherein the three-dimensional visual display depicts a network topology of the plurality of compute nodes and is colored based on the weighted color values determined for the plurality of compute nodes.

10. The method of claim 9, wherein the selected performance counters measure a number of network packets injected onto a point-to-point network connecting each of the plurality of compute nodes to one or more neighboring compute nodes.

11. The method of claim 10, wherein the point-to-point network interconnects the plurality of compute nodes to form a multi-dimensional torus.

12. The method of claim 9, wherein a second one of the one or more dedicated hardware performance counters records a number of floating point operations performed by each of the plurality of compute nodes.

13. The method of claim 9, wherein a second one of the one or more dedicated hardware performance counters records a number of cache hits/misses that occurs on each of the plurality of compute nodes.

14. The method of claim 9, wherein the generated three-dimensional wireframe image depicts a measure of one of a floating point performance and a cache performance on a given compute node of the plurality of compute nodes.

15. The method of claim 9, further comprising:
modifying a configuration setting of the plurality of compute nodes of the parallel computing system, wherein the configuration setting may be modified without disrupting the application running on the plurality of compute nodes; and
receiving an updated value for each of the dedicated hardware performance counters, wherein the updated values are received without disrupting the performance of the application running on the plurality of compute nodes; and
generating an updated three-dimensional wireframe image representing the plurality of compute nodes, wherein the updated three-dimensional visual display depicts the network topology of the plurality of compute nodes, and wherein the updated three-dimensional wireframe image is colored based on a respective weighted color value calculated for each of the plurality of compute nodes based on the received updated values, an updated maximum value and an updated minimum value.

16. The method of claim 15, further comprising storing the generated three-dimensional wireframe image and the updated three-dimensional wireframe image.

17. The method of claim 9, further comprising, generating a time-lapse animation depicting changes in the dedicated hardware performance counters that occur while the application is running on the parallel system.

18. A method for generating a visual representation of performance data for an application running on a plurality of compute nodes of a parallel computing system, wherein instances of the application communicate with one another using a first network, comprising:
receiving a value for each of one or more dedicated hardware performance counters present on the plurality of compute nodes, wherein the values are received using a second network that is separate from the first network and without disrupting the performance of the application, and wherein at least one of the dedicated hardware performance counters is configured to count a number of packets that pass through a plurality of network ports coupled to one of the plurality of compute nodes;
modifying a configuration setting of the plurality of compute nodes of the parallel computing system without disrupting the application running on the plurality of compute nodes;
receiving an updated value for each of the dedicated hardware performance counters using the second network and without disrupting the performance of the application;
calculating a difference between the received value and the received updated values for each of the plurality of compute nodes for each of the one or more dedicated hardware performance counters;
determining a maximum difference value for the dedicated hardware performance counter and a minimum difference value for the dedicated hardware performance counter, wherein the maximum difference value represents the maximum value of the calculated difference for the dedicated hardware performance counter across all of the plurality of compute nodes, and wherein the minimum difference value represents the minimum value of the calculated difference for the dedicated hardware performance counter across all of the plurality of compute nodes;

for each of the plurality of compute nodes, determining a weighted color value for the calculated difference for each of the plurality of compute nodes relative to the calculated differences for the other compute nodes in the plurality of compute nodes, wherein the weighted color value is based on the value of the calculated difference for the respective compute node, the maximum difference value, and the minimum difference value; and generating a three-dimensional (3D) wireframe image representing the plurality of compute nodes, wherein the 3D wireframe image depicts the plurality of compute nodes and further depicts the calculated difference for each of the plurality of compute nodes, and wherein the 3D wireframe image is colored based on the weighted color value determined for each of the plurality of compute nodes.

\* \* \* \* \*